(12) United States Patent
Mizuno

(10) Patent No.: US 6,572,460 B2
(45) Date of Patent: Jun. 3, 2003

(54) TANK UNIT FOR GRINDING WATER USED IN PROCESSING EYEGLASS LENS, AND EYEGLASS LENS PROCESSING APPARATUS HAVING THE SAME

(75) Inventor: Toshiaki Mizuno, Aichi (JP)

(73) Assignee: Nidek Co., Ltd., Aichi (JP)

( * ) Notice: Subject to any disclaimer, the term of this patent is extended or adjusted under 35 U.S.C. 154(b) by 0 days.

(21) Appl. No.: 10/059,349

(22) Filed: Jan. 31, 2002

(65) Prior Publication Data

US 2002/0132568 A1 Sep. 19, 2002

(30) Foreign Application Priority Data

Jan. 31, 2001 (JP) ............................ P2001-024030
Mar. 29, 2001 (JP) ............................ P2001-094951

(51) Int. Cl.[7] .................. B24B 55/03; B24B 5/35; B24B 9/14
(52) U.S. Cl. .................. 451/178; 451/43; 451/255; 451/256
(58) Field of Search .................. 451/36, 37, 42–44, 451/57, 60, 64, 65, 178, 255, 256, 319, 323–325, 384, 390, 442, 444, 446, 447, 453, 559

(56) References Cited

U.S. PATENT DOCUMENTS

| | | | | |
|---|---|---|---|---|
| 3,651,607 A | * | 3/1972 | Lee, II | 451/453 |
| 4,053,288 A | * | 10/1977 | Barron, Sr. | 451/259 |
| 4,084,944 A | * | 4/1978 | Chirico | 95/257 |
| 4,481,741 A | * | 11/1984 | Bouladon et al. | 451/285 |
| 4,665,624 A | * | 5/1987 | Wodis | 33/507 |
| 4,836,917 A | * | 6/1989 | Tomita et al. | 210/104 |
| 5,265,382 A | * | 11/1993 | Park | 451/44 |
| 5,347,763 A | * | 9/1994 | Miyamato et al. | 451/241 |
| 5,827,113 A | * | 10/1998 | Okuno et al. | 451/36 |
| 5,895,315 A | * | 4/1999 | Pinder, Jr. | 451/60 |
| 6,102,784 A | * | 8/2000 | Lichner | 451/262 |
| 6,106,375 A | * | 8/2000 | Furusawa | 451/67 |
| 6,106,728 A | * | 8/2000 | Iida et al. | 210/743 |
| 6,168,505 B1 | * | 1/2001 | Gottschald | 451/43 |
| 6,257,965 B1 | * | 7/2001 | Kamikubo et al. | 451/60 |
| 6,299,510 B1 | * | 10/2001 | Massenburg | 451/38 |
| 6,336,850 B1 | * | 1/2002 | Wada et al. | 451/287 |
| 6,375,547 B1 | * | 4/2002 | Massenburg | 451/38 |
| 6,379,538 B1 | * | 4/2002 | Corlett et al. | 210/96.1 |
| 6,482,325 B1 | * | 11/2002 | Corlett et al. | 210/662 |

FOREIGN PATENT DOCUMENTS

| | | | | |
|---|---|---|---|---|
| JP | 1-29005 | * | 9/1989 | ........... B24B/55/03 |
| JP | 2514215 | | 7/1996 | |
| JP | 11-320408 | | 11/1999 | |

* cited by examiner

Primary Examiner—Joseph J. Hail, III
Assistant Examiner—David B. Thomas
(74) Attorney, Agent, or Firm—Sughrue Mion, PLLC

(57) ABSTRACT

A grinding water tank unit which allows grinding water used in processing an eyeglass lens to be reused, has: a water tank for storing the grinding water; and a partition plate for partitioning an interior of the water tank into a drain chamber and a water suction chamber. The partition plate defines a vertical opening adjacent an interior side surface of the water tank and extending in a depthwise direction of the water tank and a horizontal opening adjacent an interior bottom surface of the water tank and extending in a direction substantially perpendicular to the depthwise direction of the water tank so that a channel is secured between the drain chamber and the water suction chamber by the openings.

12 Claims, 4 Drawing Sheets

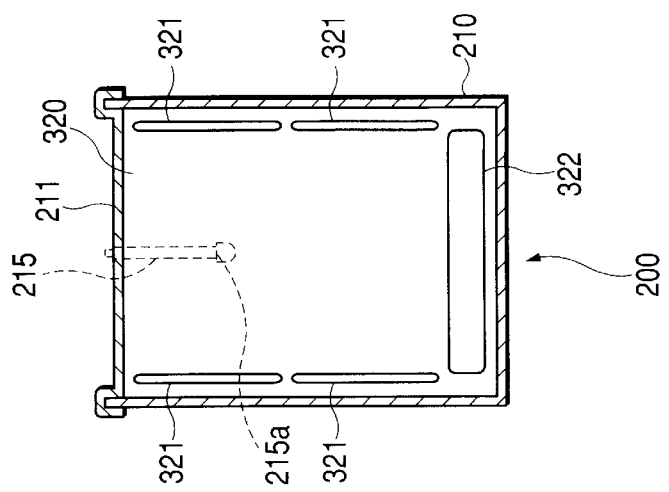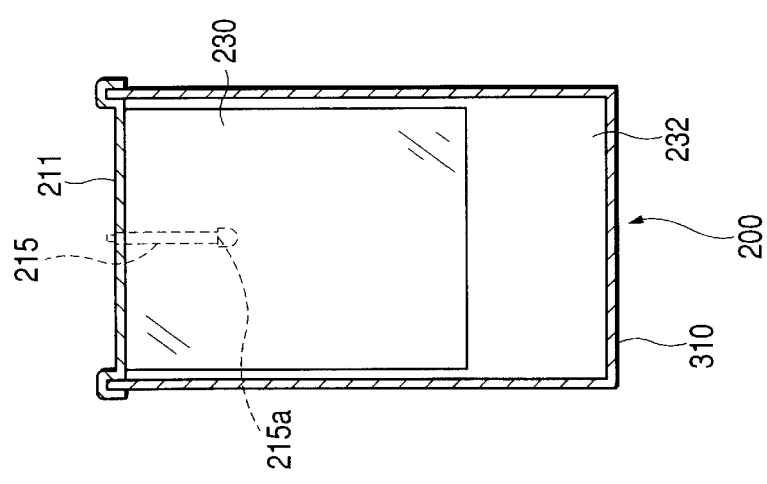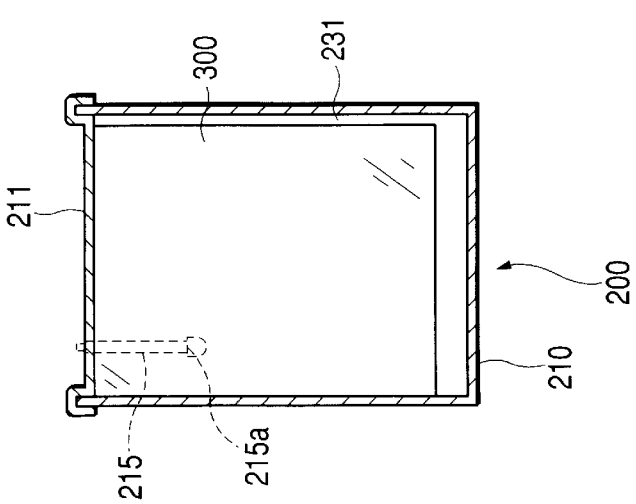

TANK UNIT FOR GRINDING WATER USED IN PROCESSING EYEGLASS LENS, AND EYEGLASS LENS PROCESSING APPARATUS HAVING THE SAME

BACKGROUND OF THE INVENTION

The present invention relates to an eyeglass lens processing apparatus for processing an eyeglass lens, and to a grinding water tank unit for storing and circulating grinding water (solution).

In an eyeglass lens processing apparatus, grinding water is supplied during processing so as to cool the ground portion of a lens and eliminate grinding debris from the lens. As this water supplying system, a system is known in which grinding water is circulated between a grinding water tank and the main body of the processing apparatus. In this system, the grinding water stored in the tank is pumped up by a pump and supplied to the main body of the processing apparatus, the grinding water after use is discharged into the tank and is reused by being circulated.

As the configuration of such a circulating-type tank, one is known in which a drain hose extending from the main body of the processing apparatus to the tank is provided with a filter so that the grinding debris will not be mixed as practically as possible in the grinding water which is reused. Another type is known in which the interior of the tank is partitioned by a filter so as to filter the grinding water.

However, in the case where the filter is used, the filter is likely to become clogged with the grinding debris from the lens. If the grinding is continued as it is, with the type in which the drain hose is provided with the filter, there are cases where the grinding water overflows into a grinding chamber of the main body of the processing apparatus due to the clogging of the filter. Meanwhile, with the type in which the interior of the tank is partitioned by the filter, there are cases where the grinding water overflows from the tank due to the clogging of the filter. For these reasons, it is necessary to frequently perform the cleaning or replacement of the filter and the cleaning of the tank interior.

In addition, if a plastic lens is ground, bubbles occur in the discharged grinding water. If the grinding is continued, there are cases where the tank becomes filled with the bubbles, or the bubbles overflow from the tank or overflow into the grinding chamber of the main body of the processing apparatus. For this reason, it is necessary to frequently perform the replacement of the grinding water or the cleaning of the tank interior.

SUMMARY OF THE INVENTION

In view of the above-described problems of the related art, it is an object of the present invention to provide a grinding water tank unit capable of reducing the trouble of maintenance as well as an eyeglass lens processing apparatus having the same.

To overcome the above-described problems, the present invention is characterized by the following features:

(1) A grinding water tank unit which allows grinding water used in processing an eyeglass lens to be reused, comprising:

a water tank for storing the grinding water; and a partition plate for partitioning an interior of the water tank into a drain chamber and a water suction chamber, wherein the partition plate defines a vertical opening adjacent an interior side surface of the water tank and extending in a depthwise direction of the water tank and a horizontal opening adjacent an interior bottom surface of the water tank and extending in a direction substantially perpendicular to the depthwise direction of the water tank so that a channel is secured between the drain chamber and the water suction chamber by the openings.

(2) The grinding water tank unit according to (1), further comprising:

a cover which-is detachably attached to an upper portion of the water tank, wherein the partition plate is attached to the cover.

(3) The grinding water tank unit according to (1), wherein the vertical opening includes a gap formed between a side end of the partition plate and the interior side surface of the water tank, and the horizontal opening includes a gap formed between a lower end of the partition plate and the interior bottom surface of the water tank.

(4) The grinding water tank unit according to (1), further comprising:

a suction unit for sucking bubbles in the grinding water discharged into the water tank; and a bubble tank for accumulating the sucked bubbles.

(5) An eyeglass lens processing apparatus for processing an eyeglass lens, comprising:

a processing chamber having a lens grinding tool disposed therein;

a water tank for storing grinding water;

a water supply unit for supplying the grinding water stored in the water tank into the processing chamber;

a drain unit for draining the grinding water from an interior of the processing chamber into the water tank; and a partition plate for partitioning an interior of the water tank into a drain chamber and a water suction chamber, wherein the partition plate defines a vertical opening adjacent an interior side surface of the water tank and extending in a depthwise direction of the water tank and a horizontal opening adjacent an interior bottom surface of the water tank and extending in a direction substantially perpendicular to the depthwise direction of the water tank so that a channel is secured between the drain chamber and the water suction chamber by the openings.

(6) The eyeglass lens processing apparatus according to (5), further comprising:

a suction unit for sucking bubbles in the grinding water discharged into the water tank; and a bubble tank for accumulating the sucked bubbles.

(7) A grinding water tank unit which allows grinding water used in processing an eyeglass lens to be reused, comprising:

a water tank for storing the grinding water;

a suction unit for sucking bubbles in the grinding water discharged into the water tank; and a bubble tank for accumulating the sucked bubbles.

(8) The grinding water tank unit according to (7), wherein the bubble tank has therein a filter for filtering water from the sucked bubbles, and the suction unit sucks the bubbles through the filter.

(9) The grinding water tank unit according to (8), further comprising:

a distribution channel for connecting the bubble tank to the water tank. (10)

(10) The grinding water tank unit according to (7), wherein the suction unit has a suction pump, and the bubble tank is provided in a substantially sealed state midway in a suction path leading from the water tank to the suction pump.

(11) An eyeglass lens processing apparatus for processing an eyeglass lens, comprising:

a processing chamber having a lens grinding tool disposed therein;

a water tank for storing grinding water;

a water supply unit for supplying the grinding water stored in the water tank into the processing chamber;

a drain unit for draining the grinding water from an interior the processing chamber into the water tank;

a suction unit for sucking bubbles in the grinding water discharged into the water tank; and a bubble tank for accumulating the sucked bubbles.

(12) The eyeglass lens processing apparatus according to (11), wherein:

the water supply unit has a water suction pump for sucking the grinding water stored in the water tank, and the suction pump is driven in linking with the water suction pump.

The present disclosure relates to the subject matter contained in Japanese patent application Nos. 2001-024030 (filed on Jan. 31, 2001) and 2001-94951 (filed on Mar. 29, 2001), which are expressly incorporated herein by reference in their entireties.

BRIEF DESCRIPTION OF THE DRAWINGS

FIGS. 3A to 3C are diagrams explaining other embodiments of at least one of a tank and the partition plate.

DESCRIPTION OF THE PREFERRED EMBODIMENT

Figure 1:
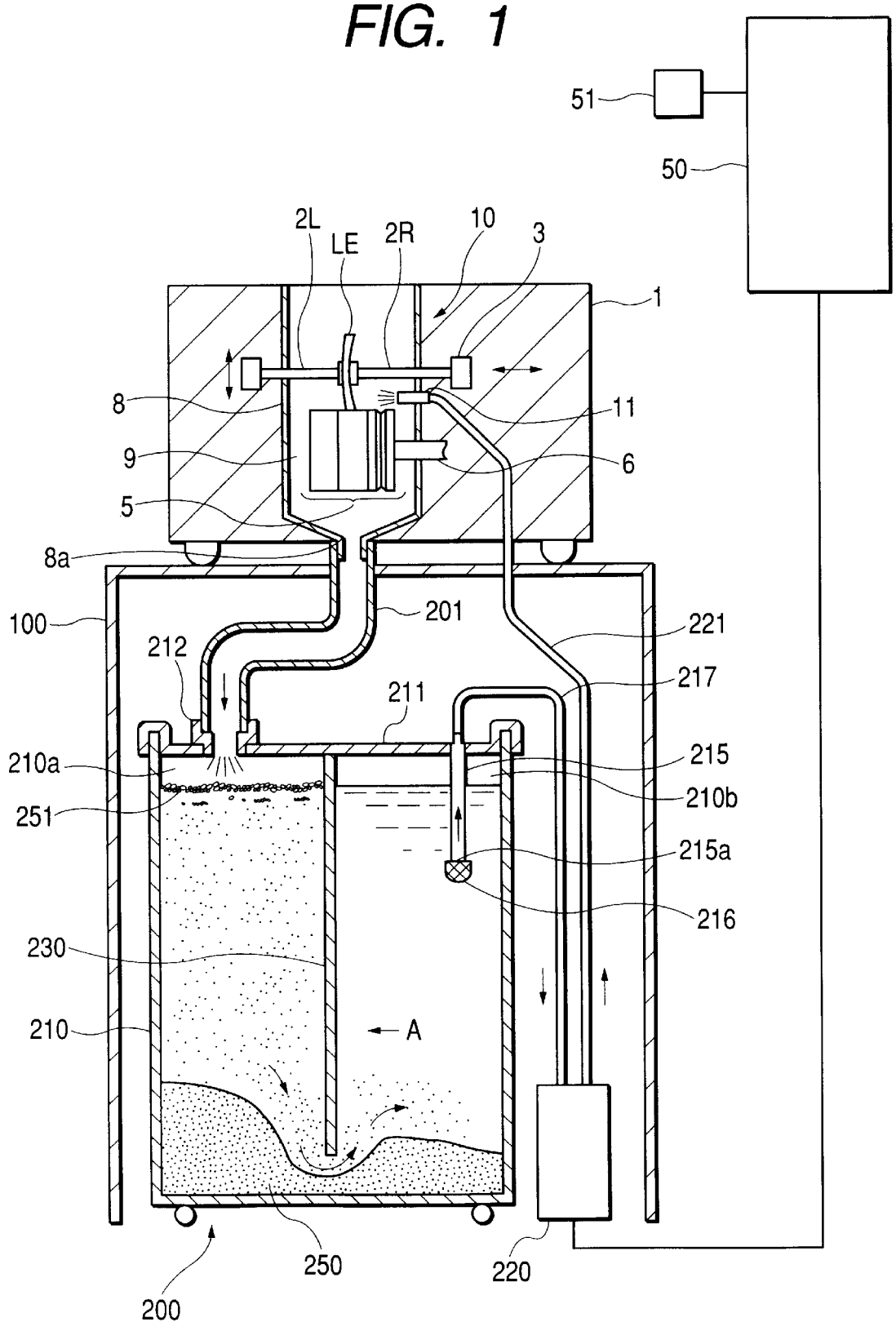
FIG. 1 is a schematic diagram of an entire eyeglass lens processing apparatus in accordance with the invention

Referring now to the accompanying drawings, a description will be given of an embodiment of the invention. FIG. 1 is a schematic diagram of an entire eyeglass lens processing apparatus in accordance with the invention. The processing apparatus is mainly comprised of a main body 1 of the processing apparatus, a table 100 for placing the main body 1 thereon, and a grinding water tank unit 200 disposed inside the table 100.

A processing section 10, which includes two lens rotating shafts (chuck shafts) 2R and 2L for holding a subject lens LE, a carriage section 3 to which the lens rotating shafts 2R and 2L are rotatably attached, a grinding wheel 5 attached to a rotating shaft 6 for grinding a peripheral edge of the lens LE, and the like, is disposed inside the casing of the man body 1. The grinding wheel 5 is made up-of three grinding wheels including a rough grinding wheel for plastics, a rough grinding wheel for glass, and a finishing grinding wheel having a V-groove for beveling and a flat grinding surface, and is rotated by an unillustrated motor. In addition, the carriage section 3 is arranged to be movable in the axial direction of the lens rotating shafts 2R and 2L and relatively movable with respect to the grinding wheel 5. For the details of the processing section 10, reference is had to be made to Re. 35,898 (JP-A-5-212661) and the like.

In addition, a processing chamber 9 is formed inside the main body 1 by a waterproof cover 8 in such a manner as to surround the lens LE held by the lens rotating shafts 2R and 2L as well as the grinding wheel 5. A nozzle 11 for jetting grinding water extends in this processing chamber 9. The nozzle 11 is connected to a water suction pump 220 of the tank unit 200 by means of a water supply hose 221. The grinding water is jetted from the nozzle 11 during the processing of the lens LE. The jetted grinding water and the grinding debris are discharged into a grinding water storage tank 210 of the tank unit 200 through a drain port 8a located in a lower portion of the cover 8 as well as a drain hose 201.

The tank 210 has a cylindrical shape with a bottom, and is provided with an unillustrated handle so as to be portable. It should be noted that the tank 210 may not be cylindrical in shape, but may be box-shaped. The tank 210 is about 30 cm in diameter, and its volume is set to be sufficient to store 18-litter grinding water. The volume of the tank 210 is preferably determined from the relationship with the sucking capacity of the pump 220. As the pump 220, one having the capability of sucking water of 5 litters/second, and it takes about two to three minutes for the grinding debris of plastic lenses and glass lenses to be deposited. For this reason, as the volume of the tank 210, one is preferable which is capable of storing grinding water in a quantity three or more times as large as the sucking quantity of the pump 220 per minute so that the grinding water is circulated in a state in which the deposition of the grinding debris is substantially completed.

A cover 211 for substantially sealing the interior of the tank 210 is detachably fitted in an opening at an upper portion of the tank 210. A connection port 212 to which the hose 210 is connected is provided at a left-side upper portion of the cover 211 offset from its center in FIG. 1, and the grinding water which is introduced by the hose 201 is discharged into the tank 210 from the connection port 212. In addition, a water suction pipe 215 extending downward is attached to a right-hand side of the cover 211 offset from its center in FIG. 1, and a coarse mesh-like filter 216 is attached to a suction port 215a at a lower end of the pipe 215. The length of the pipe 215 is determined such that the suction port 215a is located about 15 cm from a lower surface of the cover 211.

A water suction hose 217 is connected to an upper end of the pipe 215 projecting from an upper surface of the cover 211, while the other end of the hose 217 is connected to the pump 220. As the pump 220 is driven, the grinding water which has been taken in from the pipe 215 is introduced to the nozzle 11 through the hose 217 and the hose 221.

In addition, a partition plate 230 for partitioning the interior of the tank 210 into two chambers is fixed in the vicinity of the center of the cover 211 in FIG. 1. The left-hand side and the right-hand side in FIG. 1 are respectively separated into a drain chamber 210a and a water suction chamber 210b by this partition plate 230. It should be noted, however, that gaps (openings) for securing channels for allowing the grinding water to flow are respectively formed between each inner side surface of the tank 210 and each side end of the partition plate 230 and between an inner bottom surface of the tank 210 and a lower end of the partition plate 230 (the drain chamber 210a and the suction chamber 210b communicate with each other partially). Incidentally, the connection port 212 and the suction port 215a are preferably located away from the partition plate as much as possible.

Figure 2:
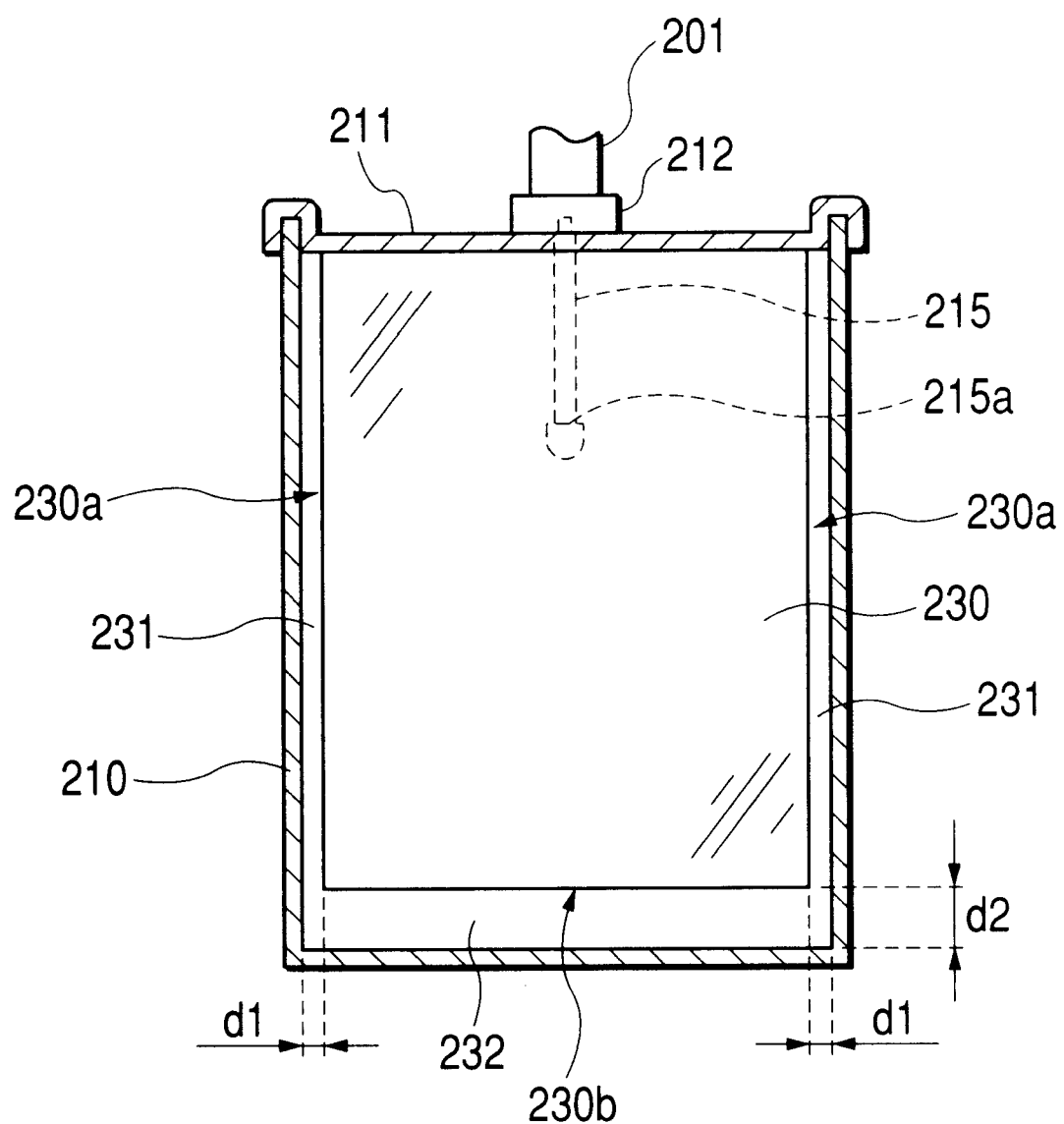
FIG. 2 is a diagram explaining the shape of a partition plate.

FIG. 2 is a diagram explaining the shape of the partition plate 230, and illustrates a state as viewed from the direction of arrow A in FIG. 1. The partition plate 230 is formed such that a side gap (vertical opening) with a width d1 is cleared in the vertical direction (in the depthwise direction of the tank 210) between each inner side surface of the tank 210 and each side end 230a of the partition plate 230. In addition, the partition plate 230 is formed such that, with the cover 211 attached, a bottom gap (horizontal opening) with a width d2 is cleared in the horizontal direction (in a direction substantially perpendicular to the depthwise direction of the tank 210) between the inner bottom surface of the tank 210 and a lower end 230b of the partition plate 230. The width d1 of each of the two side gaps 231 is preferably 3 to 10 mm, and is set to 5 mm or thereabouts in this embodiment. Further, the side end 230a of the partition plate 230 is preferably not less than 10 cm away from the suction port 215a. Meanwhile, the width d2 of the bottom gap 232 is preferably not less than 20 mm, and is set to 30 mm or thereabouts in this embodiment. Further, the lower end 230b of the partition plate 230 is preferably at a position not less than 10 cm lower than the suction port 215a.

Reference numeral 50 denotes a control unit provided in the main body 1. Connected to the control unit 50 are the pump 220, an unillustrated motor and the like of the processing section 10, a processing start switch 51, and so on.

Next, a description will be given of the use of the eyeglass lens processing apparatus having the above-described configuration. First, grinding water is poured in advance in the tank 210 in such a way as to leave a space of about 5 cm from the lower surface of the cover 211. At this time, the suction port 215a is located about 10 cm below the water level.

When the switch 51 is pressed and the processing of the lens is started by the main body 1, the pump 220 is driven by the control unit 50, and the grinding water sucked up from the suction chamber 210b is jetted into the processing chamber 9 from the nozzle 11. The jetted grinding water and the grinding debris is discharged into the drain chamber 210a through the drain port 8a and the hose 201. Since the grinding debris from general plastic lenses and glass lenses are heavier than water, they are deposited in two to three minutes. Since the drain chamber 210a and the suction chamber 210b, excluding the side gaps 231 and the bottom gap 232, are partitioned by the partition plate 230, the grinding debris mixed in the discharged grinding water are difficult to reach the suction port 215a, and most of them are deposited at the bottom of the tank 210.

When the lens is processed further, the amount of the grinding debris deposited increases. At this time, the distribution of the grinding debris which are deposited at the bottom of the tank 210 is not uniform. Reference numeral 250 in FIG. 1 denotes the deposited grinding debris. Since the grinding debris 250 are deposited in a large amount in the drain chamber 210a, and suction of grinding water is effected in the suction chamber 210b, the grinding debris 250 are deposited at the bottom gap 232 while a channel where the grinding water flows is being formed there. Although the grinding debris are contained in the grinding water which passes the bottom gap 232 (their proportion is smaller than that in the drain chamber 210a), since the suction port 215a is located above, the grinding debris are difficult to reach the suction port 215a and are deposited.

When the lens is processed still further, the grinding debris increase, so that the grinding debris come to be filled in the bottom gap 232. However, even if the grinding debris are deposited in a larger amount and fill the bottom gap 232, since the grinding water is able to pass through the side gaps 231, the grinding water does not overflow from the drain chamber 210a. When this state is reached, the proportion of the grinding debris reaching the suction port 215a increases, so that this corresponds to the timing for cleaning the interior of the tank 210.

In FIG. 1, reference numeral 251 denotes grinding debris of a polycarbonate lens. The polycarbonate lens debris float on water, but the partition plate 230 is attached to the cover 211 and is higher than the water level. For this reason, the polycarbonate lens debris move through the side gaps 231 to the suction chamber 210b only in a slight amount, and most of them remain in an upper portion of the water level in the drain chamber 210a. In addition, since the suction port 215a is located about 10 cm below the water level, the polycarbonate lens debris is prevented from being sucked. It should be noted that the filter 216 attached to the suction port 215a is designed to filter the polycarbonate lens debris 251 which moved to the suction chamber 210b in a slight amount and fibrous grinding debris produced when plastic lenses of high refraction are ground, and this filter may be omitted.

When the present inventor evaluated the condition of the grinding water at the time of lens processing by using the above-described tank unit 200, even if the conventionally used filter was absent, the polycarbonate lens debris did not come out of the nozzle 11, and the degree of contamination of the grinding water ejected from the nozzle 11 was small. In addition, it was possible to set the timing for removing the grinding debris (the timing for cleaning the interior of the tank 210) after two to three times as many as lenses have been ground in comparison with the case in which the tank of the same size was used in the conventional filter system.

When the grinding debris in the tank 210 are removed, if the cover 211 is lifted up and removed, only the tank 210 is exposed, so that the tank 210 can be carried, and the grinding debris and the contaminated grinding water can be discarded easily. In addition, if a vinyl bag is used by being inserted in the tank 210, and the cover 211 is closed on top of it, the cleaning of the interior of the tank 210 can be facilitated. Furthermore, since it is difficult for eyeglass shops to discard the grinding debris and the grinding water, it is preferable to have the grinding debris and the grinding water collected by an expert dealer. In this case, it suffices if the removed tank 210 is replaced with a new tank 210, and the tank 210 containing the grinding debris is collected as it is.

FIGS. 3A to 3C are diagrams explaining other embodiments of the tank section 200, and illustrate states as viewed from the direction of arrow A in FIG. 1 in the same way as FIG. 2.

The tank unit 200 shown in FIG. 3A has a partition plate 300 in which the side gap 231 is provided only at one side end. In this case, by offsetting the position of the pipe 215 such that the suction port 215a is located further away from the side gap 231, it is possible to reduce the amount of sucking up of the grinding debris which moved through the side gap 231 to the suction chamber 210b.

The tank unit 200 shown in FIG. 3B has a tank 310 whose heightwise dimension is set to be larger than that in FIG. 2. In this case, since the distance from the lower end 230b of the partition plate 230 to the suction port 215a is the same as that in the case of the tank 210 shown in FIG. 2, the amount of grinding debris reaching the suction port 215a through the bottom gap 232 does not increase, and it is possible to increase the amount of grinding debris deposited in the tank 310 by the portion by which the width is the bottom gap 232 is enlarged. For this reason, the timing for removing the grinding debris can be further prolonged.

In the tank unit 200 shown in FIG. 3C, vertical side openings 321 and a horizontal bottom opening 322 are directly formed in tank 210 inner side surface sides and inner bottom surface side of the partition plate 320. The openings 321 and 322 may be formed in elongated shape, circular or other similar shape, and their shapes are not limited. In addition, a partition plate 320 may be attached not to the cover 211 but to the tank 210.

Figure 4:
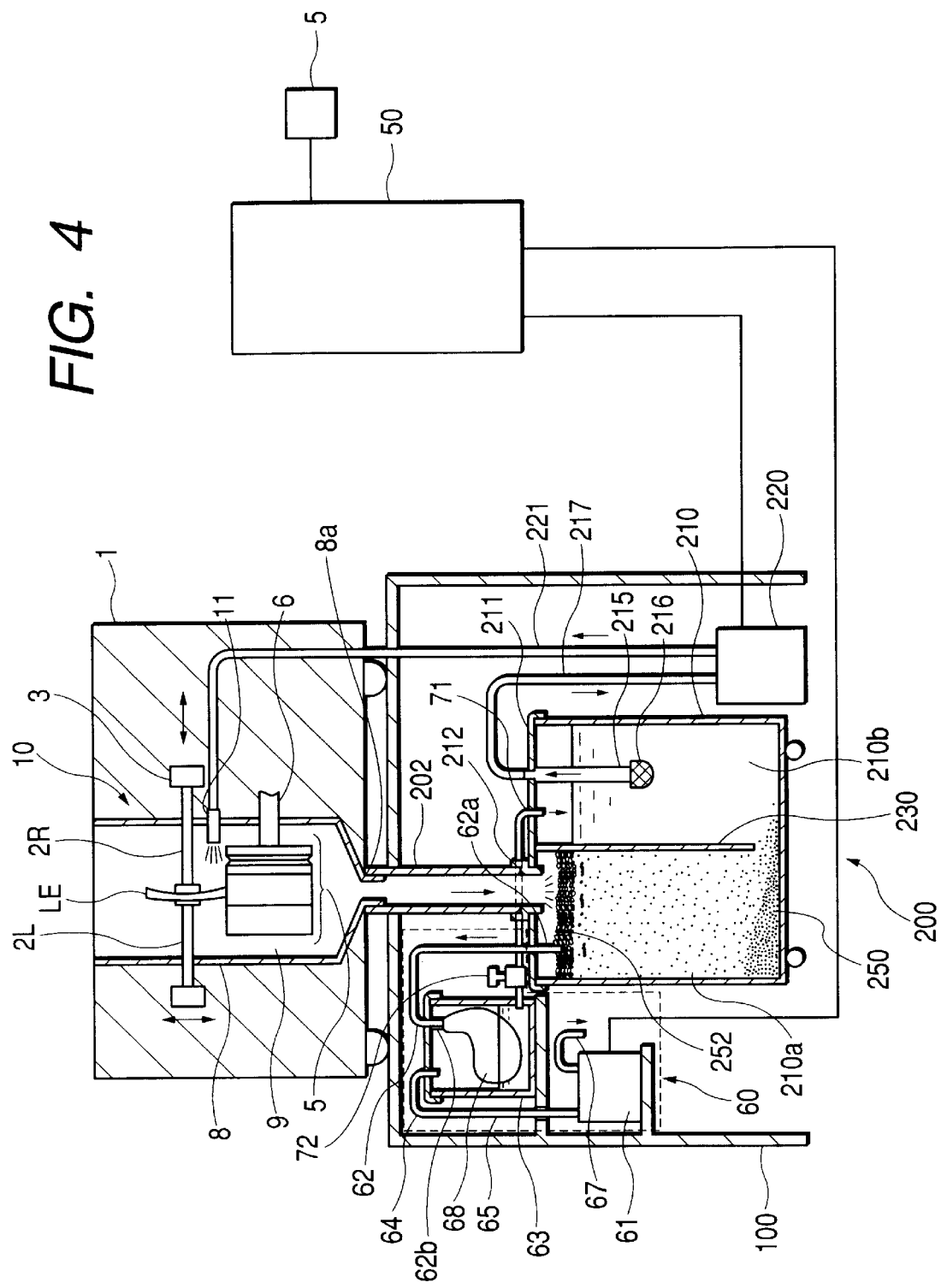
FIG. 4 is a schematic diagram of the overall eyeglass lens processing apparatus with a bubble removing unit added.

In addition, bubbles are produced in the grinding water which is discharged when the grinding of a plastic lens is performed. Although the upper portion of the tank 210 is set in a substantially sealed state by the cover 211 so as to prevent the bubbles from overflowing from the tank 210, a bubble removing unit may be provided for removing the bubbles accumulated in the tank. FIG. 4 is a schematic diagram of the overall eyeglass lens processing apparatus with the bubble removing unit added. It should be noted that the same component elements as those shown in FIG. 1 are denoted by the same reference numerals.

Reference numeral 60 denotes a bubble removing unit for removing accumulated bubbles 252. A suction hose 62 is passed through the cover 211 on the drain chamber 210a side, and an end portion 62a of the hose 62 is fixed to the cover 211 so as to be located on a slightly upper side than the level of the grinding water inside the tank 210. The other end portion 62b of the hose 62 is fixed to a cover 64 of a tank 63 for collecting the bubbles, and a bag-like filter 68 for filtering the water contained in the bubbles is attached to its distal end. Namely, the filter 68 functions to separate the grinding debris by causing the water and air among components of the bubbles to escape outside the filter 68. A suction hose 65 extends from the cover 64 and is connected to a suction pump 61. The tank 63 is substantially sealed by the cover 64 so that the interior of the tank 63 is set under negative pressure when suction is effected by the pump 61, and joint portions of the cover 64 and the hose 62, as well as the cover 64 and the hose 65, are also substantially sealed. The gas sucked by the pump 61 is exhausted by an exhaust hose 67.

In addition, the tank 63 is connected to the suction chamber 210b of the tank 210 by means of a distribution hose 71. Since the tank 63 is disposed at a position higher than the tank 210, if a valve 72 is opened, the water in the tank 63 flows out to the suction chamber 210b by the gravity. It should be noted that the valve 72 is closed during the lens processing so as to maintain the interior of the tank 63 under negative pressure.

In the eyeglass lens processing apparatus having the above-described configuration, when the switch 51 is pressed and the lens processing is started, the pump 220 is driven by the control unit 50, which in turn causes the grinding water sucked up from the suction chamber 210b to be jetted inside the processing chamber 9 from the nozzle 11. The jetted grinding water and grinding debris are discharged into the drain chamber 210a.

When the processing of a plastic lens is effected, bubbles are produced in the discharged grinding water, and these bubbles are accumulated in the upper portion of the drain chamber 210a. At the point of time the switch 51 is pressed, the pump 61 is driven by the control unit 50 in interlocked relation to the pump 220. As the suction force of the pump 61 is transmitted through the hose 65, the tank 63, and the hose 62, the bubbles accumulated in the tank 210 are sucked from the end portion 62a of the hose 62. The sucked bubbles pass through the hose 62, and are accumulated in the filter 68 inside the tank 63. Since the interior of the tank 63 is set under negative pressure by the suction force of the pump 61, the grinding debris in the sucked bubbles remain inside the filter 68, and the water and air are released outside the filter 68. The released water stays inside the tank 63, while the released air is sucked by the pump 61, thereby maintaining the negative pressure within the tank 63. It should be noted that the water accumulated in the tank 63 has been filtered by the filter 68, if the valve 72 is opened, the water flows through the hose 71, is returned to the suction chamber 210b, and is reused.

In addition, instead of using the valve 72, a mechanism may be adopted in which a suction pump is provided midway in the hose 71, and the water accumulated in the tank 63 is returned to the tank 210. In this case, there is no need to dispose the tank 63 at a position higher than the tank 210.

As described above, in accordance with the invention, the trouble of maintenance of the grinding water tank unit can be reduced by a simple arrangement. Furthermore, it is possible to prevent the grinding water and bubbles from overflowing.

What is claimed is:

1. A grinding water tank unit which allows grinding water used in processing an eyeglass lens to be reused, comprising:
   a water tank for storing the grinding water; and
   a partition plate for partitioning an interior of the water tank into a drain chamber and a water suction chamber,
   wherein the partition plate defines a vertical opening adjacent an interior side surface of the water tank and extending in a depthwise direction of the water tank and a horizontal opening adjacent an interior bottom surface of the water tank and extending in a direction substantially perpendicular to the depthwise direction of the water tank so that a channel is secured between the drain chamber and the water suction chamber by the openings.

2. The grinding water tank unit according to claim 1, further comprising:
   a cover which is detachably attached to an upper portion of the water tank,
   wherein the partition plate is attached to the cover.

3. The grinding water tank unit according to claim 1, wherein the vertical opening includes a gap formed between a side end of the partition plate and the interior side surface of the water tank, and the horizontal opening includes a gap formed between a lower end of the partition plate and the interior bottom surface of the water tank.

4. The grinding water tank unit according to claim 1, further comprising:
   a suction unit for sucking bubbles in the grinding water discharged into the water tank; and
   a bubble tank for accumulating the sucked bubbles.

5. An eyeglass lens processing apparatus for processing an eyeglass lens, comprising:
   a processing chamber having a lens grinding tool disposed therein;
   a water tank for storing grinding water;
   a water supply unit for supplying the grinding water stored in the water tank into the processing chamber;
   a drain unit for draining the grinding water from an interior of the processing chamber into the water tank; and
   a partition plate for partitioning an interior of the water tank into a drain chamber and a water suction chamber,
   wherein the partition plate defines a vertical opening adjacent an interior side surface of the water tank and extending in a depthwise direction of the water tank and a horizontal opening adjacent an interior bottom surface of the water tank and extending in a direction substantially perpendicular to the depthwise direction of the water tank so that a channel is secured between the drain chamber and the water suction chamber by the openings.

6. The eyeglass lens processing apparatus according to claim 5, further comprising:

a suction unit for sucking bubbles in the grinding water discharged into the water tank; and a bubble tank for accumulating the sucked bubbles.

7. A grinding water tank unit which allows grinding water used in processing an eyeglass lens to be reused, comprising:

a water tank for storing the grinding water;

a suction unit for sucking bubbles in the grinding water discharged into the water tank; and a bubble tank for accumulating the sucked bubbles.

8. The grinding water tank unit according to claim 7, wherein the bubble tank has therein a filter for filtering water from the sucked bubbles, and the suction unit sucks the bubbles through the filter.

9. The grinding water tank unit according to claim 8, further comprising:

a distribution channel for connecting the bubble tank to the water tank.

10. The grinding water tank unit according to claim 7, wherein the suction unit has a suction pump, and the bubble tank is provided in a substantially sealed state midway in a suction path leading from the water tank to the suction pump.

11. An eyeglass lens processing apparatus for processing an eyeglass lens, comprising:

a processing chamber having a lens grinding tool disposed therein;

a water tank for storing grinding water;

a water supply unit for supplying the grinding water stored in the water tank into the processing chamber;

a drain unit for draining the grinding water from an interior the processing chamber into the water tank;

a suction unit for sucking bubbles in the grinding water discharged into the water tank; and a bubble tank for accumulating the sucked bubbles.

12. The eyeglass lens processing apparatus according to claim 11, wherein:

the water supply unit has a water suction pump for sucking the grinding water stored in the water tank, and the suction unit has a suction pump which is driven in linking with the water suction pump.

* * * * *